Oct. 3, 1939.    W. G. CURRY    2,175,078
CUTTING TOOL
Filed April 28, 1938
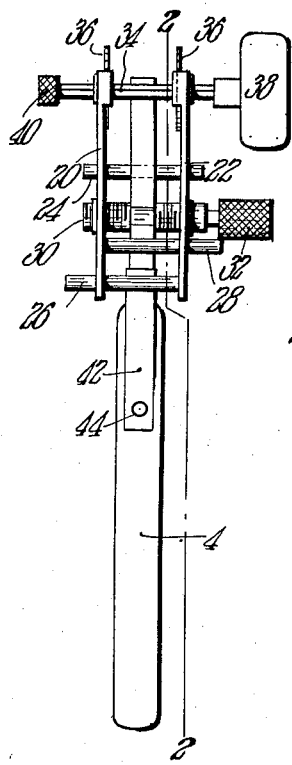
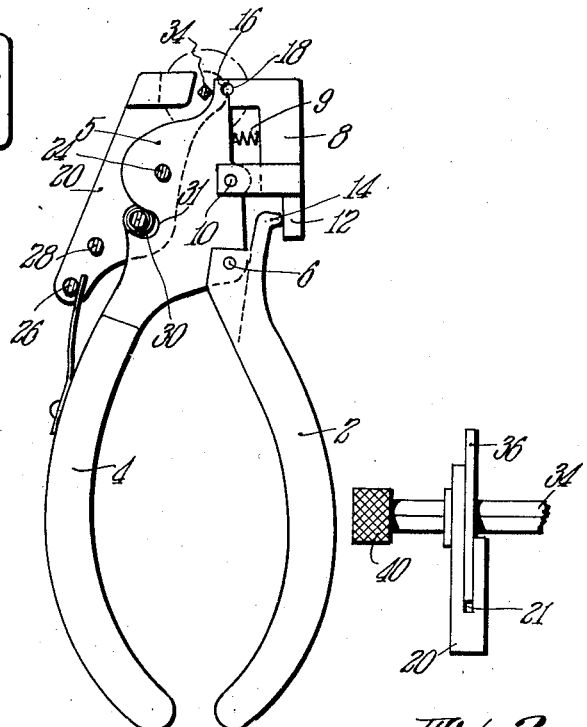
INVENTOR.
William G. Curry.
BY
ATTORNEY.

Patented Oct. 3, 1939

2,175,078

UNITED STATES PATENT OFFICE 2,175,078

CUTTING TOOL

William G. Curry, Agawam, Mass., assignor to Williams Jewelry Distributors Corp., Springfield, Mass., a corporation of Massachusetts Application April 28, 1938, Serial No. 204,909

2 Claims. (Cl. 29—70)

This invention relates to improvements in cutting tools and is directed more particularly to improvements in tools for cutting short lengths of rods, tubes, etc.

The principal objects of the invention are directed to the provision of a cutting tool adapted to be manipulated by the hand and which is so constructed and arranged as to efficiently and quickly cut off lengths of metallic rods, tubes etc. The device of this invention is particularly adapted for use by jewelers and the like, who are required to provide a short metal tubular members for use in the manufacture and repair of bracelets and the like.

According to this invention, the tool is simple in form so as to consist of a relatively few parts, yet it is efficient in operation. Its various novel features of construction and its advantages will be hereinafter more fully referred to in connection with the accompanying description of the present preferred form of the invention, and reference will be had to the drawing, wherein;

Fig. 1 is a front elevational view of the cutting tool of the invention;

Fig. 2 is a side elevational and sectional view on the line 2—2 of Fig. 1; and

Fig. 3 is an enlarged plan view of one of the side members of the tool shown in Figs. 1 and 2.

Referring now to the drawing more in detail, the invention will be fully described.

A pair of manually engageable handle members 2 and 4 are provided and these are pivoted for relative movement at 6. The handle members 2 and 4 are preferably shaped to conveniently fit the hand.

There is a clamping member 8 pivoted to the member 4 as by pivot 10. This member 8 has a downwardly-extending portion 12 and the upper ends of both the members 4 and 8 are provided with cooperating work-holding grooves 16 and 18 as shown.

A spring 9 may be interposed between the members 4 and 8 so as to normally urge the member 8 away from member 4. A cam 14 provided on the handle member 2 is adapted to operate in conjunction with the part 12 of member 8 to bring the latter into clamping relation with respect to the member 4 when the members 2 and 4 are squeezed in the hand.

Thus the grooves or seats 16 and 18 may hold the work which is to be operated upon, such as a rod, tube or the like, and with the work placed between the seats, the members 2 and 4 are squeezed together so that the work is securely gripped and held in place for the action of the cutting parts now to be described.

Side plates or brackets 20 and 22 are slidable and oscillatable on a pivot 24 associated with an upper part 5 of the member 4. A guide rod 26 extending from plate 22 is slidable in plate 20 while a guide rod 28 extending from the plate 20 is slidable in the plate 22, said rods being arranged so that the plates are guided as they move towards and away from one another as will now appear.

A screw 30 which preferably has right hand threads on one end and left hand threads on the other is provided. This has an intermediate part disposed in a slot 31 which is provided just below part 5 of the member 4 while the threaded parts of the screw 30 are in threaded engagement with the plates 20 and 22.

A manually engageable member 32 on screw 30 is provided to facilitate rotating the screw and the arrangement is such that as the screw is rotated the plates 20 and 22 are moved either towards or away from one another and the screw is so held and the threads are such that the brackets move equally in either direction relative to the work-clamping members.

A shaft 34 is rotatable and slidable in the plates 20 and 22 and it is preferably square as shown. Cutting members, which may be small saws 36, are disposed in slots 21 formed in plates 20 and 22, such slots 21 being preferably as shown in Fig. 3.

The cutters 36 have square openings so as to be driven by the square shaft 34 and the arrangement is such that the wheels are movable with the plates relative to the shaft 34. A key or handle member 38 is provided on one end of shaft 34 for rotating the said shaft and a member 44 is provided on the opposite end of said shaft for preventing removal of the plates from off the shaft.

The guided plates 20 and 22 combine to form a cutter support and this, as stated, swings on the pivot 24. Preferably there is a flat spring member 42 having one end secured to the handle member as at 44 and its other end freely disposed beneath the guide 26.

The said spring 40 swings the support or plates in the direction of the work and tends to cause the cutters to cut through the work when the shaft 34 is rotated.

The construction and arrangement of the members 2, 4 and 8 make it possible to firmly and securely grip the work while the plates carrying the saws may be moved away from the work when desired. Then when the plates are released, they are urged into a position where the cutters may act on the work.

While I have described the invention in great detail and with respect to the present preferred form thereof, it is not desired to be limited thereto since many changes and modifications may be made therein without departing from the spirit and scope of the invention.

What it is desired to claim and secure by Letters Patent of the United States is:

1. A cutting tool of the class described comprising in combination, a pair of handle members pivoted together, a work-engaging member pivoted to one of said handle members so as to be movable towards and away therefrom and adapted to cooperate therewith for clamping work therebetween, a support associated with said one handle member including a pair of brackets pivoted so as to be movable towards and away from the other members in the direction of movement of the latter, means for bringing about movement of said work-engaging member towards and away from said one handle member, a rod associated with said support having screw-threaded parts extending through said brackets whereby the same may be moved towards and away from one another, and a rotatable cutter wheel associated with each of said brackets, said rod being normally held in a slot provided in said one member.

2. A cutting tool of the class described comprising in combination, a pair of work-engaging members having parts pivoted together so as to be movable towards and away from the other, a support associated with one of said members including a pair of brackets pivoted so as to be movable towards and away from the other members in the direction of movement of the latter, a slot being provided in said one member, a rotatable rod associated with said support having an intermediate part normally disposed in said slot and screw-threaded end parts extending through said brackets whereby the same may be moved towards and away from one another, and a rotatable cutter wheel associated with each of said brackets.

WILLIAM G. CURRY.